United States Patent [19]
Sato

[11] 4,191,882
[45] Mar. 4, 1980

[54] AUTOMATIC FOCUS ADJUSTING DEVICE

[75] Inventor: Hideharu Sato, Higashikurume, Japan

[73] Assignee: Nihon Beru-Haueru Kabushiki Kaisha (Bell & Howell Japan, Ltd.), Higashimurayama, Japan

[21] Appl. No.: 925,677

[22] Filed: Jul. 18, 1978

[30] Foreign Application Priority Data

Jul. 18, 1977 [JP] Japan ................... 52-084979

[51] Int. Cl.$^2$ ............................. G03B 3/10
[52] U.S. Cl. ..................... 250/201; 250/204; 354/25
[58] Field of Search ............ 250/201, 204; 354/25; 356/4

[56] References Cited
U.S. PATENT DOCUMENTS 4,156,563  5/1979  Kato et al. ................. 250/201 X

*Primary Examiner*—David C. Nelms
*Assistant Examiner*—Darwin R. Hostetter
*Attorney, Agent, or Firm*—John R. Crossan; Roger M. Fitz-Gerald

[57] ABSTRACT

An automatic focus adjusting device for use with an optical instrument having a focusable objective lens which is adjusted by optical and electronic components of the instrument, such components determining the distance of an object by comparing images of separate scanning and reference optical systems. The device of the present invention has a low-reduction filter screen placed across part of each light path of the two optical systems. The filters provide an overriding apparent contrast to low-contrast object fields to cause the system to adopt a pre-set focus distance, but do not interfere with normal automatic focusing where object field contrast is adequate for normal system operation. Manual adjustment of the filter spacing varies the pre-set, low-contrast focus to any desired object distance setting. Five to ten percent light reduction in the screened part of each filter is adequate.

8 Claims, 3 Drawing Figures

AUTOMATIC FOCUS ADJUSTING DEVICE

The present invention relates to automatic focus adjusting systems wherein automatic focusing is interrupted when the object field has such a low contrast that the system is unable to operate normally.

Various automatic focusing devices have been developed and used for electrically driven cameras, especially for movie cameras. Such automatic focusing devices have, for example, two optical systems, one of which is fixed and the other of which has a pivotable mirror or other device for scanning an object field to be photographed. A light image formed by each of the two optical systems is directed onto a plurality of light responsive elements. The electronic system of the camera produces a focus signal when the light images of the reference and scanning systems are similarly distributed on the light-responsive elements. The focus signal is used to determine the distance between the camera and the object and to set the objective lens of the camera to such distance automatically.

In such automatic focusing devices, where an object field has a high contrast among its elements, a small change in the scanning angle of the mirror of the scanning system produces a corresponding change in output of the light-responsive elements. The electronic control system then produces a correct output signal and lens focus corresponding with the change in the scanning angle. However, when the object field has a low contrast, the light responsive elements and the electronic systems are unable to differentiate small changes in the scanning angles, resulting in large distance measuring errors and misfocusing of the objective lens.

The present invention overcomes such drawbacks in the known automatic focusing systems by providing a pair of filters, each partially screened and partially transparent, one in each of the optical systems, to produce an apparent contrast on which the object lens focuses automatically to a pre-set distance when the contrast of the object field is below the contrast provided by the filter screen parts. Adjusting the spacing of the pair of light filters adjusts the focusing distance of the automatic focus adjusting system.

Figure 1:
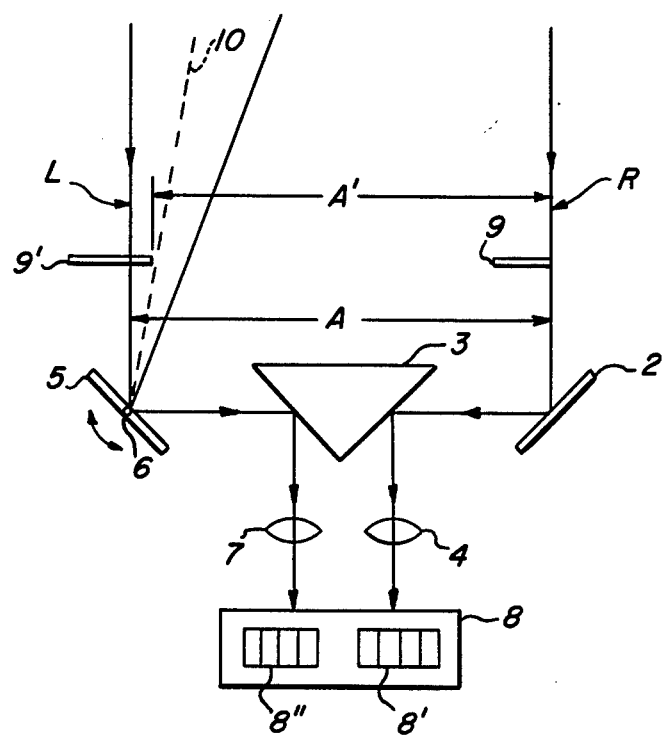
FIG. 1 is a schematic diagram of the distance measuring system in an automatic focus adjusting device with interposed light filters according to the present invention.

FIG. 1 shows schematically the method of distance measuring used in the present invention, having a stationary optical system R and a scanning optical system L. The system R has a stationary mirror 2, a mirror prism 3, and a lens 4 for gathering and orienting light from a first optical path. The scanning optical system L has a movable mirror 5 which is swingable pivotably on an axis 6 to gather light from objects from an infinite spacing from the system to a minimum focusing distance. The scanning system uses a second side of the prism 3 and a lens 7. Optical images of a field of view are formed upon an optical sensor 8, the stationary optical system 4 forming an image on a plurality of photoconductive elements 8', and a corresponding image from the scanning system L upon a second, corresponding plurality of photoconductive elements 8".

The movement of the pivotable mirror 5 is controlled over time. As the mirror scans upon an object to be photographed, the image distributions of the stationary and scanning optical systems R, L become identical or in coincidence with each other twice on each cycle. Electronic apparatus associated with the optical sensor 8 generates a focus signal upon each such coincidence. The objective lens is then moved automatically to a focussed position according to the distance information obtained by processing the focus signal in comparison with the time-position of the scanning mirror. Such automatic focus adjusting system is known from the Japanese public patent disclosure Tokkai SHO No. 51-83524, which disclosure is incorporated by reference hereinto. Although the stationary and scanning optical systems are referred to herein as "R" and "L", no limitation on the possible relative spatial orientation of the two optical systems is intended thereby.

Figure 3:
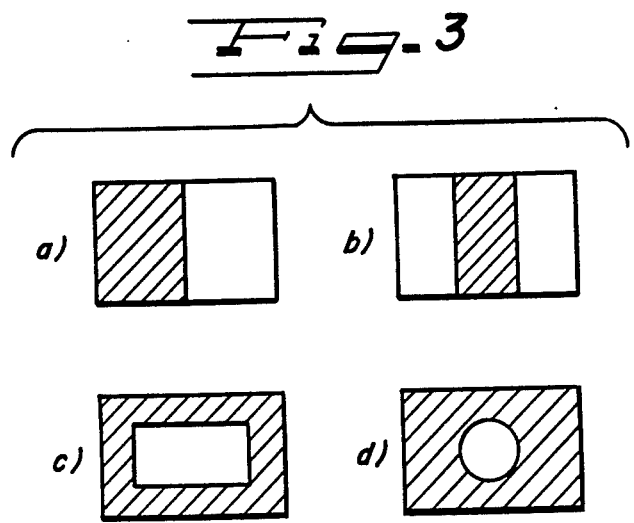
FIG. 3 depicts four light filter screens usable with the present invention.

According to the principles of the present invention, a pair of light filters 9 and 9' is provided, each in one of the optical paths of the optical systems L and R. The filters are arranged at a spacing nearly equal to the distance A between the central incoming light paths of the systems at infinite focus. The filters employ partial screening, having an unobstructed part or parts and a light reducing part, as shown in FIG. 3, parts a, b, c, and d. For instance, in FIG. 3(a), the left half of the filter reduces incoming light intensity by a few percent, while the right half is substantially transparent. In FIG. 1, only the left half of each of the filters 9, 9' is shown.

In an automatic focus adjusting device not employing the filters of the invention, when the scanning system scans a low contrast object, for instance, the sky, no adequate image coincidence outputs can be obtained from images formed on the photoconductive sensing elements 8', 8". However, when the filters are used, the selective reduction of incoming light intensity produces an effect of an apparent object of adequate contrast at a distance depending on the spacing of the filters 9, 9'. Then sufficient electronic comparison signals are produced by the two photoconductive sensing elements to allow the regular automatic system to function.

For instance, as shown in FIG. 1, a focus signal is generated when the swingable mirror 5 scans in the direction of the dashed line 10. The electronic system of the camera moves the objective lens to the focusing distance corresponding to the direction indicated by the dashed line 10, without relation to the distance of any actual object in the field of view. Thus, the automatic focusing system continues to operate even when the field of view has a low or no contrast. In such case a focusing signal is generated at a pre-settable focus distance by creating an apparent contrast by means of the controlled spacing between the two filters. The spacing of the two filters thus effects a stand-by focusing distance which will automatically be reverted to by the focusing system under conditions of low contrast object fields.

Figure 2:
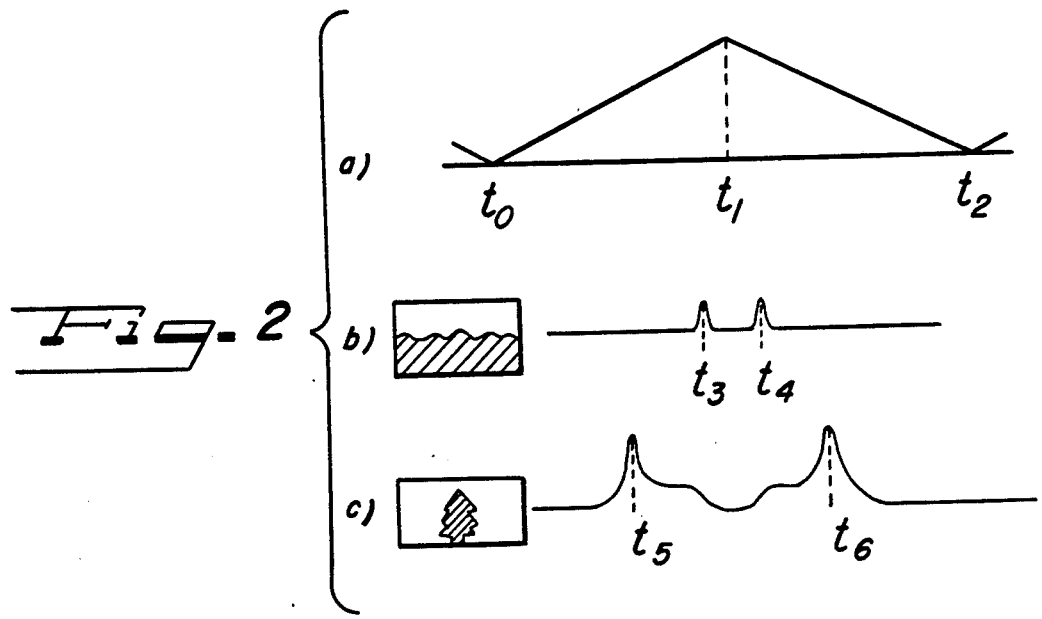
FIG. 2 is a series of graphic and pictorial representations (a)–(c) showing the relationship between the scanning of the automatic focusing system and the focus signal generating timing, with low and high-contrast object fields.

FIG. 2 depicts the relationship between the scanning of the swingable mirror 5 and the focus signal generation timing. The mirror scans to minimum distances at times $t_0$ and $t_2$ and to the infinite at time $t_1$ as shown in FIG. 2(a). When the object to be photographed has a low contrast, as, for instance, the sky or a uniform landscape, and the filters 9 and 9' are separated by distance A', the optical sensing system generates focus signals at timings $t_3$ and $t_4$ according to the apparent contrasts created by the filters, without relation to the actual distance to the object, as shown in FIG. 2(b). The objective lens of the camera is thus adjusted to a focusing distance corresponding to the focus signals $t_3$ and $t_4$.

On the other hand, where the object field has a high contrast, as in FIG. 2(c), the optical sensor generates focus signals at times $t_5$ and $t_6$ when the mirror 5 actually scans the object. The peaks of the coincidence signals are not affected by the lesser apparent contrast created by the filters 9 and 9', whereby accurate focusing upon the actual object is accomplished automatically.

Test results show that light reduction of five to ten percent in the screening parts of the filters is desirable for use with the present invention. Such filter has no effect on automatic distance measuring when an object having contrast adequate for automatic focusing is in the object field. When a low contrast object is photographed, the filter effectively produces apparent contrast to prevent failure of the automatic focusing system.

In addition to the pre-set focusing feature, insertion of filters into the optical paths allows for adjustment of the light intensities of the two optical paths, as for adjustment for variations in manufacturing tolerances of the lens systems.

The form of the filter is not limited to that described herein, but any of various identical filter screens are usable. In FIG. 3(a) the light reducing screen is provided as a left half of the filter. In FIG. 3(b) a light reducing portion is provided in the center of the filter, as a rectangle. In FIG. 3(c), the light reducing screen is provided as a peripheral band about the filter, with a transparent center section of rectangular form. In FIG. 3(d), a transparent center aperture in the form of a circle is provided in an otherwise complete screen of the filter.

Although various minor modifications may be suggested by those versed in the art, it should be understood that embodied within the scope of the patent warranted hereon are all such modifications as reasonably and properly come within the scope of the present contribution to the art. The invention is to be limited only by the scope of the claims granted hereon, and including all reasonable equivalents of the structure disclosed and claimed herein.

What is claimed is:

1. In an automatic focus adjusting system of an electrically driven and electronically controlled optical apparatus, the focus adjusting system having two optical systems at least one of which has a scanning means, and wherein the focus adjusting system is normally controlled by coincidence of light images from the two optical systems upon pairs of photoelectric elements and an electronic processing system generating timing signals from the position of the scanning means, an automatic focus adjusting device comprising:

a pair of substantially identical light filters, each placed in the light path of one of the optical systems and each having a transparent portion and a light screening portion, the light filters being spaced apart at a selected distance from one another corresponding to a desired pre-focusing distance, whereby said pre-focusing distance is detected by the adjusting system upon viewing of low contrast object fields.

2. An automatic focus adjusting device as defined in claim 1, in an automatic focus adjusting system, wherein the selected distance between the filters is adjustable, for setting the pre-focus distance to a desired value.

3. An automatic focus adjusting device as defined in claim 1, in an automatic focus adjusting system, wherein the distance between the two light filters is nearly equal to the distance between the light paths of two optical systems arranged at an infinite scan.

4. An automatic focus adjusting device as defined in any of claims 1, 2, or 3, in an automatic focus adjusting system, wherein the light screening portion of each of said filters reduces five to ten percent of the incoming light intensity.

5. An automatic focus adjusting device as defined in claim 4, in an automatic focus adjusting system, wherein the transparent portion and the light screening portion of each filter are of equal size and of the same shape.

6. An automatic focus adjusting device as defined in claim 4, in an automatic focus adjusting system, wherein said light screening portion of each filter comprises a rectangular portion in the middle part of the filter, with transparent portions on either side thereof.

7. An automatic focus adjusting device as defined in claim 4, in an automatic focus adjusting system, wherein said transparent portion of each said filter comprises a transparent square portion in a middle part, and said light screening portion occupies a circumferential part of said filter.

8. An automatic focus adjusting device as defined in claim 4, in an automatic focus adjusting system, wherein said transparent portion of each said filter is a circular member in the middle part of each filter, and the light screening portion occupies the balance of said filter.

* * * * *